(12) United States Patent
Ball

(10) Patent No.: US 7,249,609 B2
(45) Date of Patent: Jul. 31, 2007

(54) YARD HYDRANT WITH CLOSURE VALVE CHECK VALVE

(75) Inventor: William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 74 days.

(21) Appl. No.: 11/161,978

(22) Filed: Aug. 24, 2005

(65) Prior Publication Data

US 2007/0044838 A1   Mar. 1, 2007

(51) Int. Cl.
*F16K 37/00* (2006.01)
(52) U.S. Cl. ............ 137/285; 137/301; 137/852; 137/855; 137/558
(58) Field of Classification Search ........... 137/285, 137/301, 272, 558, 559, 855, 852
See application file for complete search history.

(56) References Cited

U.S. PATENT DOCUMENTS

| 1,349,062 A | * | 8/1920 | Goldberg | ............... 137/283 |
| 3,858,599 A | * | 1/1975 | Carlson | ............... 137/218 |
| 4,073,307 A | * | 2/1978 | Royce | ............... 137/283 |
| 4,303,223 A | * | 12/1981 | Whisenhunt et al. | ....... 251/357 |
| 4,483,361 A | * | 11/1984 | Jungbert, Sr. | ............... 137/301 |
| 4,842,018 A | * | 6/1989 | White et al. | ........... 137/614.11 |

* cited by examiner

*Primary Examiner*—Kevin Lee

(57) ABSTRACT

A yard hydrant having a valve body with a valve seat and a drain port. A closure valve disposed within the valve body and engaging the valve seat. The valve body having a conduit in fluid communication with the drain port and a hollow interior of the valve body. A check valve disposed within the conduit to prevent fluid flow from the drain port through the conduit to the hollow interior.

5 Claims, 2 Drawing Sheets

YARD HYDRANT WITH CLOSURE VALVE CHECK VALVE

BACKGROUND OF THE INVENTION

This invention is directed toward a yard hydrant, and more specifically to a yard hydrant that prevents contaminants and the like from entering the yard hydrant.

Yard hydrants are well known in the art and have an inlet valve connected to a water supply that is located below the frost line in the ground. When a hydrant is shut off, a drain port at the inlet valve is opened to allow water in the hydrant to drain out. The problem with this design is that ground water or other contaminants can enter the yard hydrant through the same drain port, thus creating an unacceptable cross-connection.

Therefore, there is a need in the art for a yard hydrant that addresses these problems.

A principal objective of the present invention is to provide a yard hydrant that prevents backflow through the drain port.

A further objective of the present invention is to provide a yard hydrant that provides a signal when ground water leaks into the hydrant.

These and other objectives will be apparent to those skilled in the art.

BRIEF SUMMARY OF THE INVENTION

A yard hydrant having a valve body coupled to an inlet water pipe, a standpipe coupled to a valve body, and a head casting coupled to the standpipe. The valve body has a valve seat and a drain port. Disposed within the valve body is a valve or plunger attached to an actuator rod or valve stem that extends vertically through the standpipe and is operatively connected to a lever or faucet handle. The head casting has an inlet port, an outlet port and a conduit that extends from the inlet port to the outlet port. Mounted within the closure valve is a check valve that is positioned to prevent the flow of ground water or other contaminants from entering the yard hydrant through the drain port.

DETAILED DESCRIPTION OF THE PREFERRED EMBODIMENT

Figure 1:
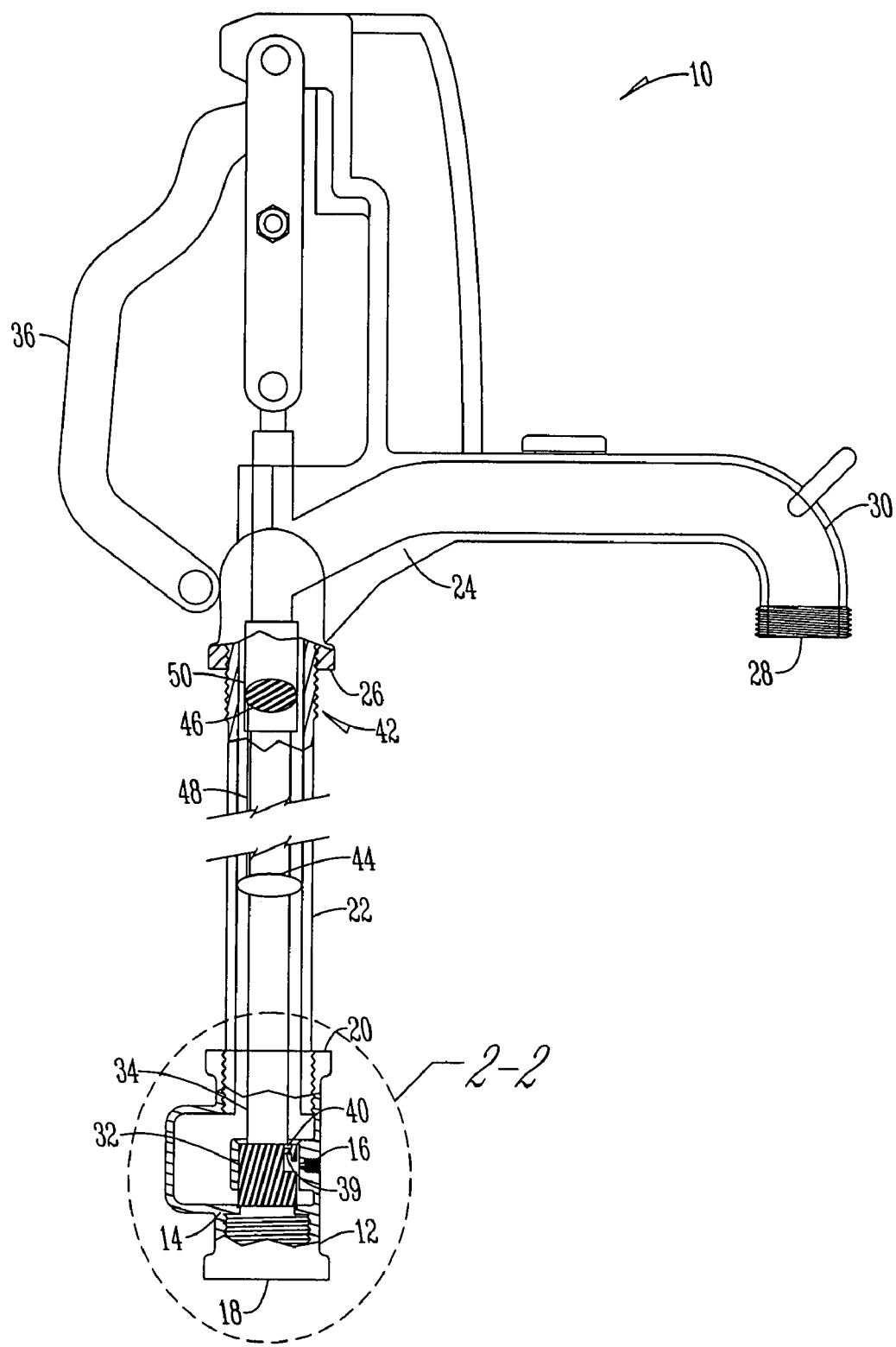
FIG. 1 is a side view of a yard hydrant.
Figure 2:
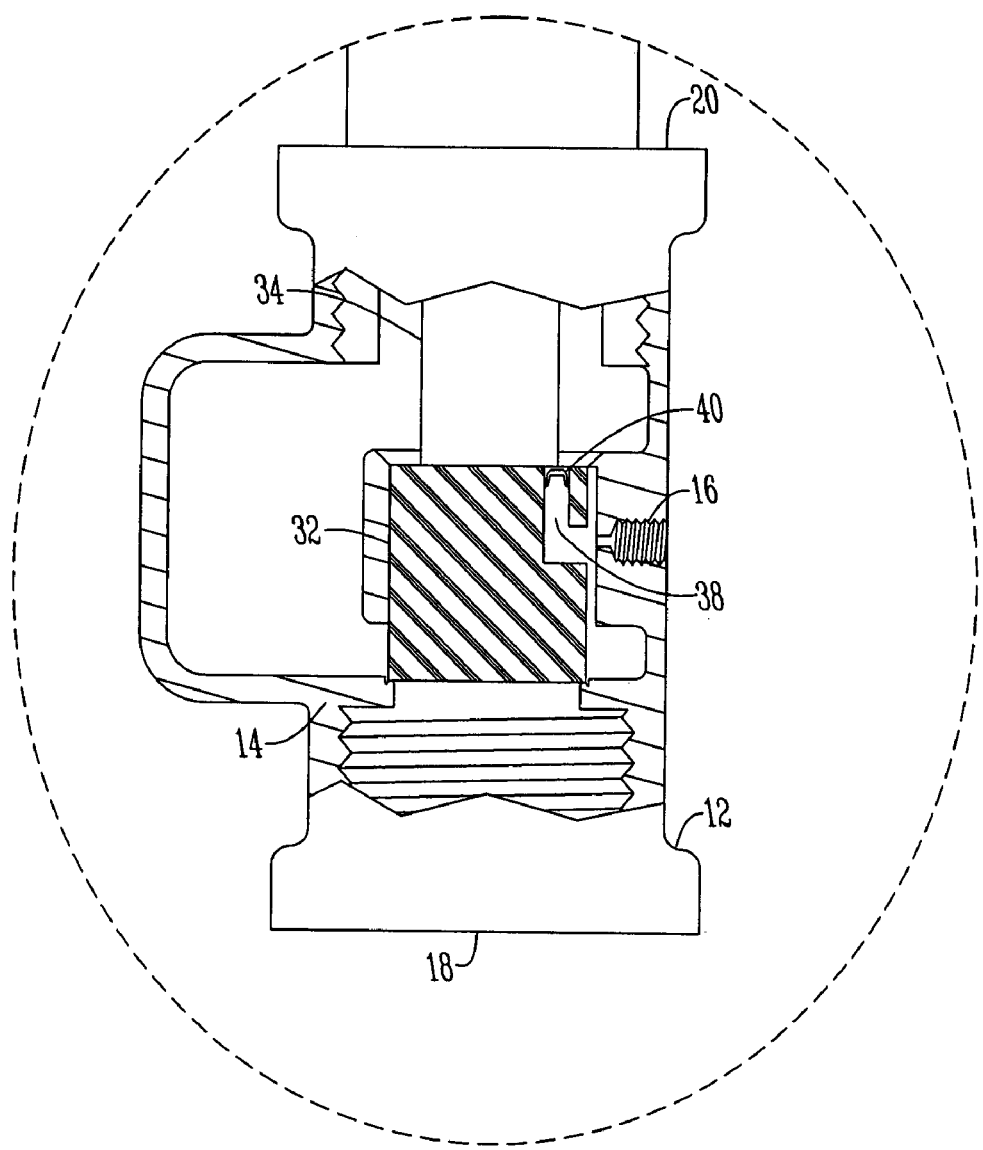
FIG. 2 is an enlarged side view of a check valve within a valve seat of a yard hydrant from FIG. 1.

A yard hydrant 10 has a valve body 12 which has a valve seat 14, a drain port or hole 16, an inlet 18 which is connected to a source of pressurized water (not shown) and an outlet 20 at its top. Connected at one end to the valve body 12 is a standpipe 22 that extends vertically and is connected to a head casting 24 at the opposite end.

The head casting 24 has an inlet 26 coupled to the standpipe 22 and a discharge conduit or outlet 28 that preferably extends downwardly and outwardly from the head casting 24 and a fluid conduit 30 that extends between the inlet 26 and the outlet 28.

Disposed within the valve body 12 is a closure valve plunger 32 that is connected to a valve stem or actuator rod 34 that extends from the closure valve 32 through the standpipe 22 and is connected to an actuator device 36 attached to the head casting 24 such as a lever or handle.

The closure valve 32 has a conduit 38 that is in fluid communication with the drain port 16 at one end and the hollow interior of the valve body 12 at the opposite end. Disposed within conduit 38 is a check valve 40 which allows fluid to flow from the valve body 12 to the drain port, but prevents fluid flow from the drain port 16 to the valve body 12. The check valve 40 is of any type including but not limited to a spring loaded valve or a backflow preventor such as that disclosed in U.S. Pat. No. 5,632,303, incorporated by reference herein in its entirety.

A signal mechanism 42 is operatively connected to the yard hydrant to indicate if fluid has leaked from the drain port 16 into the hollow interior of the valve body 12 and the standpipe 22. While the signal mechanism 42 may take many forms, in one example a float 44 is slidably mounted to the valve rod 34. Slidably mounted in spaced relation to the float 44 is an indicator member 46 such as a colored ball or the like. The float 44 is connected to the ball 46 by a spacer rod 48. When fluid has leaked into the standpipe 22 the ball 46 is visible through a slot or opening 50 in the standpipe 22. When the closure valve 32 engages the valve seat 14 the hydrant is in a closed position which prevents water from flowing from the water source to the discharge conduit 28. In this position, the drain port 16 permits water to drain out of the pipe 22 and into the ground. The check valve 40 prevents water from flowing in the opposite direction from the ground into the hydrant 10 through the drain port 16. When the closure valve 32 is disengaged from the valve seat 14, the closure valve 32 seals the drain port 16 and water is permitted to enter the standpipe 22 and under pressure flow toward the discharge conduit 28.

If, when the closure valve 32 is in its closed position, and fluid leaks past the check valve 40, as fluid engages the float 44, the float 44 will rise along with the fluid within standpipe 22. Because the float 44 is connected to the indicator 46 by spacer bar 48, the indicator 46 will rise as well until it is seen through opening 50. Thus, if the indicator 46 is seen through opening 50 when the hydrant 10 is in its off or closed position, one will know there is leakage beyond the check valve 40.

It will be appreciated by those skilled in the art that other various modifications could be made to the device without the parting from the spirit in scope of this invention. All such modifications and changes fall within the scope of the claims and are intended to be covered thereby.

What is claimed is:

1. A yard hydrant, comprising:
   a valve body having a valve seat and a drain port;
   a closure valve receivable within the valve body that engages the valve seat;
   a conduit that extends through the closure valve, the conduit having one end in fluid communication with the drain port and the opposite end in fluid communication with a hollow interior of the valve body; and
   a check valve disposed within the conduit that allows fluid to flow from the hollow interior through the conduit to the drain port and prevents fluid flow from the drain port through the conduit to the hollow interior.

2. The hydrant of claim 1 further comprising a standpipe mounted to and in fluid communication with the valve body.

3. The hydrant of claim 2 where in a valve rod is connected to the closure valve, the rod extending into and through the standpipe.

4. The hydrant of claim 3 further comprising a signal mechanism mounted to the valve rod.

5. The hydrant of claim 1 further comprising a signal mechanism that detects when fluid leaks from the drain port past the check valve and into the hollow interior of the valve body.

* * * * *